July 6, 1948.  W. B. LEAF  2,444,454
EVAPORATOR FOAM CONTROL APPARATUS
Filed March 10, 1943
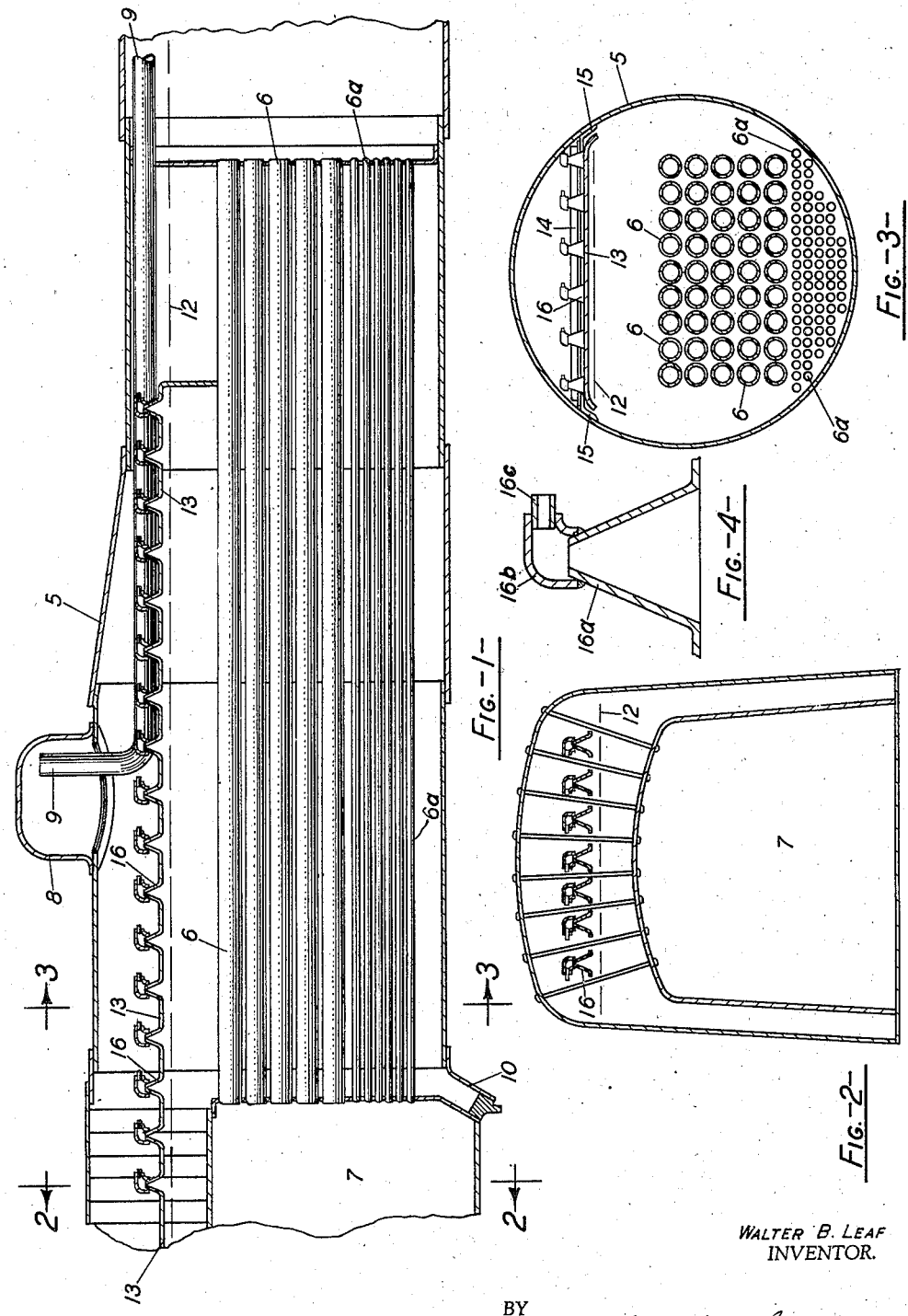
WALTER B. LEAF
INVENTOR.
BY
*H. A. McGrew*
ATTORNEY.

Patented July 6, 1948

2,444,454

UNITED STATES PATENT OFFICE 2,444,454

EVAPORATOR FOAM CONTROL APPARATUS

Walter B. Leaf, Denver, Colo.

Application March 10, 1943, Serial No. 478,616

9 Claims. (Cl. 252—361)

This invention relates to apparatus for retarding foaming in evaporators, and more particularly the boilers of locomotives. This present invention is related to my copending application, Serial No. 362,479, filed October 23, 1940 for Foam retarding means and method, which issued as Patent No. 2,320,366 on June 1, 1943, and features disclosed but not claimed herein have been made the subject matter of claims in said patent.

In order to have a foam-forming condition, there must be some composition suspended or dissolved in the liquid and the concentration of the dissolved material must be substantial before foaming occurs. Usually foaming doesn't develop in locomotives until the concentration reaches 150 to 175 grains dissolved matter per gallon of liquid.

When foaming conditions develop in a locomotive boiler, it passes out through the steam line and if superheater units are used, the foam may be completely evaporated by the action of the boiler. Under such circumstances, scale is formed by the deposit of suspended and dissolved matter carried to such units by the foam. If the foam passes through them to the steam cylinders, lubricant is washed off and physical damage is done to pistons, cylinders and the like with consequent reduction in power output.

It is an object of the invention to provide a simple, economical and efficient apparatus for retarding foam formation in evaporators.

Another object of the invention is to provide a simple, durable and efficient device for retarding foam formation in boilers, which is adapted for installation in a variety of places in a boiler.

A further object of the invention is to provide a simple and efficient apparatus for eliminating the splattering effect of bubble bursting occurring above the liquid level in evaporators, such as locomotive boilers.

A still further object of the invention is to provide effective apparatus for limiting the depth of a foam or froth bed, formed by the action of bubbles continuously rising in a body of liquid during continuous evaporation.

Other objects reside in novel details of construction, novel combinations and arrangements of parts, and novel steps and processes all of which will be described in the course of the following description.

Briefly stated, the apparatus of the present invention comprises means for collecting bubbles or foam, preferably at a plurality of points and above the level of the body of liquid, means for coalescing such bubbles during upward movement to form larger bubbles, as by restricting lateral movement thereof, means for rupturing such larger bubbles, preferably mechanically, as by further restricting lateral movement in a squeezing action and/or changing the direction of movement thereof, and means for discharging the ruptured fragments, or liquid resulting from rupture of the larger bubbles, substantially horizontally and in a direction to return the same to the foam bed or body of liquid. All of the above means are preferably disposed in the space above the normal level of the body of liquid.

The invention is susceptible of embodiment in a variety of forms and the accompanying drawings illustrate typical embodiments. In the drawings in the several views of which like parts have been designated similarly, Figure 1 is a fragmentary vertical central section through a locomotive boiler illustrating embodiments of the invention incorporated therein;

Figure 2 is a section taken along the line 2—2, Figure 1;

Figure 3 is a section taken along the line 3—3, Figure 1; and

Figure 4 is a vertical, central section, drawn to an enlarged scale, through one of the foam-retarding members illustrated in Figure 1.

The boiler illustrated in Figure 1 is designated generally by the reference numeral 5 and has a conventional arrangement of large tubes 6 and small tubes 6a extending from a firebox 7, while a dome 8 above the tubes 6 is provided with the usual type of dry pipe 9. Adjacent the lower surface of the firebox 7, the boiler is provided with a drainage outlet 10.

In normal operation, the boiler is kept filled with liquid to the approximate level indicated by the dotted line 12, and in the practice of the present invention, a series of collector plates 13 extend through the boiler 5 above and in proximity to the liquid level 12.

Each of said plates is suitably supported in such position in boiler 5 in any suitable manner. A convenient arrangement has been illustrated in Figure 3 in which the plates 13 are provided with integral strap members 14 which are suspended on angle brackets 15 fixed on the inner walls of boiler 5.

Each of said plates 13 is provided with a series of openings from which nozzle members 16 extend, the details of which will be best understood by reference to Figure 4. The nozzle members comprise open-ended body members 16a, preferably conical in shape, with the wide end fixedly held on a plate member 13. At the top or narrow end of the body 16a, a discharge jet 16b is fixedly held by brazing or otherwise forming thereon to provide an integral assembly and the jet terminates in a laterally or horizontally-directed spout 16c.

These nozzle members may be made of a variety of materials, but usually are formed of metal. Since they are disposed above the liquid body it is not so essential to avoid galvanic action as in the forms shown in my aforesaid Patent No. 2,320,366. However, if desired, the nozzles can be made of the same composition as the boiler plates. Flexible materials such as rubber and synthetic compositions may be used and preferably should be a composition able to withstand high temperatures without deterioration.

The plates 13 are positioned throughout the boiler and above the liquid level 12 in the various regions where foam formation occurs. As illustrated, they are substantially contiguous with the tubes 6, and also are located in the boiler section above firebox 7, preferably at a substantial distance below the top of boiler 5.

Consequently, as the bubbles form in the liquid of the boiler and rise to the surface, they form a bed of foam which on reaching plates 13 is directed into the individual nozzle members 16, subjected to coalescence in an energy-dissipating action therein, and caused to break, with the shattered remnants of the coalesced bubbles flowing out of the spouts 16c and eventually returning to the surface 12 of the liquid across the ends of plate members 13 as will be best understood by reference to Figure 3.

I do not wish to be limited to any given proportions in the size and arrangement of nozzle members, as my experiments have demonstrated that a variety of sizes and shapes may be used. However, I have found that for a conventional type locomotive boiler, best results are attained when the nozzle members 16a are 4½ inches in height, 4½ inches in diameter at the bottom opening and ⅝ of an inch in diameter at the top opening.

With a device of the aforesaid type installed in a boiler, it is unnecessary to have anti-foam compounds introduced into the liquid, although such compounds may be used, if desired. The foam-retarding effect of the devices effects a substantial reduction in blow-off operations with lessened scoring of pistons and cylinders, less scaling of superheaters and a material reduction in losses through blowing out packings.

In particular, the elimination of the splattering effect of the foam bed on the surfaces of the crown sheet of the boiler and in the dome 8 by the present invention materially reduces the danger of damage to such parts. This control of the foam formation is so positive, that the foam level can be held within safe limits long after the concentration of dissolved and suspended matter has reached a stage where excessive foaming normally would occur.

The drawings are intended to illustrate typical embodiments of the invention and many variations are contemplated within the spirit and scope of the invention. Thus, in Figure 4 the spout portion 16c has been indicated as a separable nipple inserted in the end of the L-member 16b. For many purposes, such an arrangement will not be necessary as the discharge opening of member 16b will provide a satisfactory spout. The size of this opening will vary with different treatments and for different sized evaporator units.

Similarly, the spouts 16c of the various forms may be directed in different directions. This feature has been suggested in the drawings, as Figure 1 illustrates the nozzles extending lengthwise of the boiler, whereas Figures 2 and 3 indicate a position transverse to the lengthwise axis of the boiler. Sometimes, it will be preferable to have part of the nozzles extending in one direction, and part in an opposite direction, as in the regions forward and backward of the dome 8 for example.

In the foregoing description, the invention has been described in its application to locomotive boilers, but it is well suited for use in a variety of evaporating actions, of which, sugar refinery evaporators, the concentration and evaporation of food products, evaporation actions in ore dressing treatments and the like may be cited as typical.

Changes and modifications may be availed of within the spirit and scope of the invention as defined in the hereunto appended claims.

What I claim and desire to secure by Letters Patent is:

1. In apparatus for retarding foam and froth formation in boilers and pressure vessels, inclusive of a container for a body of liquid subject to evaporating influences and having foam-producing bubbles rising therethrough, the improvement which comprises a partitioning member supported in overhanging relation to the liquid body, said partitioning member having a plurality of vertically directed passages to permit escape of vapors or bubbles formed by said evaporating action, said passages having a lower intake opening of a size to admit a plurality of bubbles concurrently and in spaced relation and having a laterally-directed upper discharge outlet restricted sufficiently to induce coalescing engagement and rupture of a plurality of bubbles admitted simultaneously to the passage.

2. In apparatus for retarding foam and froth formation in boilers and pressure vessels, inclusive of a container for a body of liquid subject to evaporating influences and having foam-producing bubbles rising therethrough, the improvement which comprises a partitioning member supported in proximate overhanging relation to the liquid body, said partitioning member having a plurality of vertically directed passages to permit escape of vapors or bubbles formed by said evaporating action, said passages having a lower intake opening of a size to admit a plurality of bubbles concurrently and in spaced relation and having a laterally-directed upper discharge outlet restricted sufficiently to induce coalescing engagement and rupture of a plurality of bubbles admitted simultaneously to the passage.

3. In apparatus for retarding foam and froth formation in boilers and pressure vessels, inclusive of a container for a body of liquid subject to evaporating influences and having foam-producing bubbles rising therethrough, the improvement which comprises a partitioning member supported in overhanging relation to the liquid body, said partitioning member having a plurality of vertically directed conical passages to permit escape of vapors or bubbles formed by said evaporating action, said passages having a lower intake opening of a size to admit a plurality of bubbles concurrently and in spaced relation and having a laterally-directed upper discharge outlet restricted sufficiently to induce coalescing engagement and rupture of a plurality of bubbles admitted simultaneously to the passage.

4. In apparatus for retarding foam and froth formation in boilers and pressure vessels, inclusive of a closed container for a body of liquid subject to evaporating influences and having foam-producing bubbles rising therethrough, the improvement which comprises a partitioning member supported in overhanging relation to the liquid body and spaced from the top of said container closure, said partitioning member having a plurality of vertically directed passages to permit escape of vapors or bubbles formed by said evaporating action, said passages having a lower intake opening of a size to admit a plurality of bubbles concurrently and in spaced relation and having a laterally-directed upper discharge outlet restricted sufficiently to induce coalescing engagement and rupture of a plurality of bubbles admitted simultaneously to the passage.

5. In apparatus for retarding foam and froth formation in boilers and pressure vessels, inclusive of a closed container for a body of liquid subject to evaporating influences and having foam-producing bubbles rising therethrough, the improvement which comprises a partitioning member supported between the top of said container closure and the normal liquid level in the container, said partitioning member having a plurality of vertically directed passages to permit escape of vapor or bubbles formed by said evaporating action, said passages having a lower intake opening of a size to admit a plurality of bubbles concurrently and in spaced relation and having a laterally-directed upper discharge outlet passage of substantially less cross-sectional dimension than the narrowest part of said vertical passage.

6. In an evaporator, a plurality of nozzles having an upwardly diminishing cross-sectional area and a laterally directed discharge outlet at the upper end thereof; and means for supporting said nozzles in predetermined positions above the normal level of liquid in said evaporator.

7. In an evaporator, the improvement defined in claim 6, wherein said nozzles are conical in shape and said outlets comprise spouts attached to said nozzles adjacent the upper ends thereof.

8. In an evaporator, the improvement defined in claim 6, wherein said outlets are directed generally in the same lateral direction.

9. In an evaporator, the improvement defined in claim 6, wherein at least a portion of said outlets are directed in a different lateral direction than the remainder of said outlets.

WALTER B. LEAF.

REFERENCES CITED

The following references are of record in the file of this patent:

UNITED STATES PATENTS

| Number | Name | Date |
|---|---|---|
| 23,328 | Gardner | Sept. 6, 1859 |
| 519,969 | Rayner | May 15, 1894 |
| 553,841 | Cooper | Feb. 4, 1896 |
| 632,785 | Hornish | Sept. 12, 1899 |
| 2,385,522 | Malott | Sept. 25, 1945 |

FOREIGN PATENTS

| Number | Country | Date |
|---|---|---|
| 38,431 | Netherlands | June 15, 1936 |